Dec. 13, 1949      A. A. CAMPBELL      2,491,161
COLLAPSIBLE TUBE DISPENSER
Filed Sept. 24, 1948
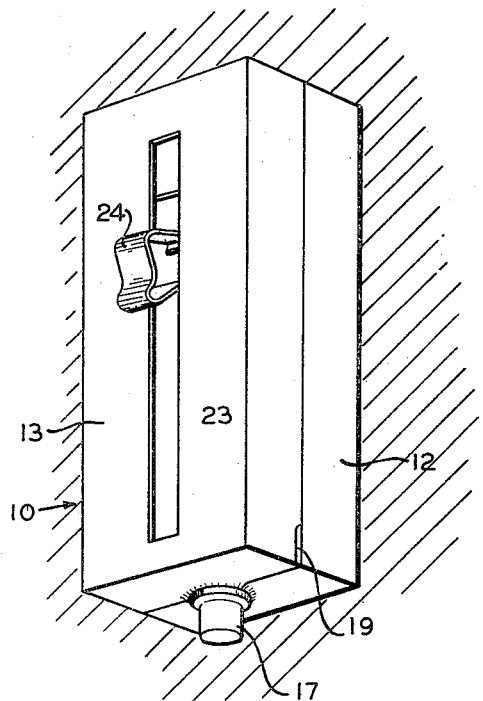
FIG.1
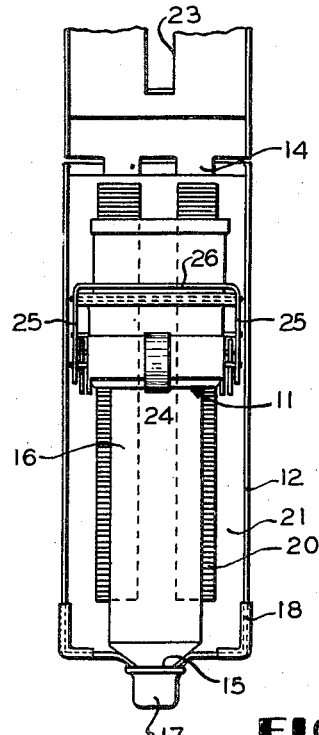
FIG.2
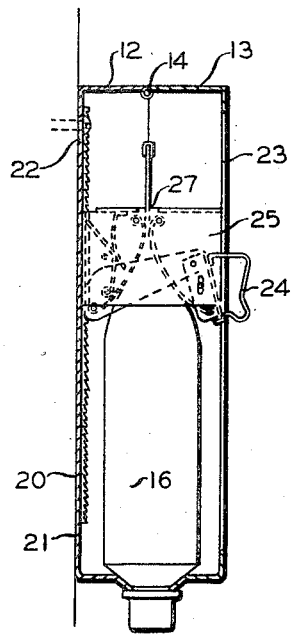
FIG.3
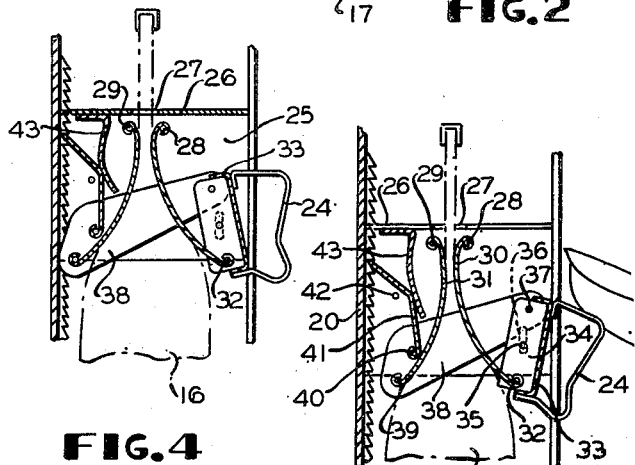
FIG.4      FIG.5
INVENTOR
ALEXANDER A. CAMPBELL
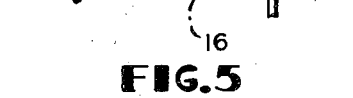
ATTORNEYS Patented Dec. 13, 1949

2,491,161

UNITED STATES PATENT OFFICE 2,491,161

COLLAPSIBLE TUBE DISPENSER

Alexander A. Campbell, Springfield, Mass.

Application September 24, 1948, Serial No. 50,992

2 Claims. (Cl. 222—103)

This invention relates to devices for dispensing paste or analogous material from a collapsible tube.

The principal objects of this invention are to provide a new and improved structure in this class of devices and to provide a device to dispense paste from a tube without breaking the collapsible walls thereof.

Features of improvement include a convenient, neat and attractive box casing to hold and conceal a collapsible tube and a new wringer mechanism in the casing to simulate the firm but gentle action of the fingers when manually squeezing paste from a tube, such mechanism, in addition, being adapted to press positively and uniformly, substantially all the contents progressively from the tube.

A further feature of improvement is in the combination of this squeeze mechanism with a ratchet mechanism to advance the wringer along the tube after its squeezing action and to automatically lock the squeezing mechanism in such advanced position, both squeeze and ratchet mechanisms being constructed and arranged to be actuated by thumb pressure on a convenient lever extending through the box casing.

Other objects, features and advantages will be apparent as the invention is more fully disclosed.

The accompanying drawing illustrates a preferred embodiment of the invention, the various figures being as follows:

Fig. 1 is a perspective view of the exterior of the new dispensing device with a collapsible tube contained therein;

Fig. 2 is a top plan view of Fig. 1 with the box casing open and the lid partially broken away;

Fig. 3 is a longitudinal cross section of Fig. 1 showing in side elevation the shell for the internal movable mechanism;

Fig. 4 is a fragmentary longitudinal sectional view of the box casing and of the movable mechanism shown by Fig. 3 with a fragment of a collapsible tube indicated therein; and Fig. 5 is a view similar to Fig. 4 but showing the parts moved to tube squeezing position.

The dispensing device consists of two assemblies, a casing 10 and a movable mechanism 11 fitting within the casing (Figs. 1 and 2). Casing 10 is preferably made in box form with a bottom portion 12 and a hinged lid 13, the hinge 14 being positioned at one end of the box casing. At the other end of the casing, both bottom portion 12 and lid 13 are partially cut away and flared to form an opening 15 for the neck of a collapsible tube 16. The cap 17 of tube 16 fits snugly against the flared edge opening 15 as shown in Fig. 2.

Corner snaps 18 cooperate with pinched mating edge portions 19 of lid 13 to hold the casing closed and add rigidity. The casing is preferably of a size convenient to handle and manipulate in the palm of the user's hand.

A rack 20 is fastened securely to the floor 21 of the bottom portion 12. For convenience, the rack may be made as two spaced longitudinal strips, as shown. This allows a hole 22 (Fig. 3) to be easily made through floor 21 by which the dispensing device may be hung. The perspective view of Fig. 1 shows the device in a hanging position.

In the top of lid 13, a longitudinal slot 23 is provided and through this slot extends an actuating lever 24 of the movable mechanism 11.

The movable mechanism 11 has a skeleton frame or shell U-shaped in cross section and consisting of two identical flat side plates 25 and a back plate 26. Back plate 26 has a long horizontal slot 27 substantially centrally disposed in plate 26. Slot 27 is of a size to receive and pass the flat rear end of the tube when collapsed.

Bordering on the horizontal slot 27 and held by and between the two side plates 25 of the shell are two hinge pins 28 and 29. Hinge pins 28 and 29 pivotably hold each rearward end of two convex curved mating squeeze plates 30 and 31.

The outer end of squeeze plate 30 is pivotably held on a pin 32 fastened to the forward end of an actuating platform plate 33 with skirted end portions 34 and on which is mounted the actuating lever 24. Platform plate 33 is mounted in the frame shell on a centrally disposed pin 35, the ends of which rest in opposite slots 36 of side plates 25. A third pin 37 fastened rearwardly on platform plate 33 pivotally supports at its ends the upper portions of two flat hinge plates 38. These hinge plates hang in parallel relation to side plates 25 and at the lower ends thereof are joined by a pin 39. On pin 39 is pivotally held the outer end of squeeze plate 31.

Hinge plates 38 also carry at the lower ends thereof a pin 40. Pin 40 pivotally holds one edge of a ratchet plate or rocker arm 41 which is centrally bent to extend at its free edge into contact with the rack 20. A stop bar 42 limits the pivotal swing of the ratchet plate to a desired lowered position. A spring member 43 mounted on the back plate 26 of the shell presses against the rocker arm and yieldingly holds it toward the support bar and into operative contact with the rack.

The operation of the dispenser structure will now be described. Lid 13 is raised on hinge 14 to open the box casing 10 and manually move mechanism 11 to the rear of the casing. The flat end of a collapsible tube is pushed through the opening between squeeze plates 30 and 31 in front of the opening 27 in the back plate 26. Squeeze plates 30 and 31 are then in the relative positions as shown by Fig. 4.

Casing 10 is closed with the cap 17 of the tube projecting beyond the flared opening 15. The device is now loaded and ready to dispense the contents of the tube when the cap is removed.

Dispensing may be done from the hanging position shown in Fig. 1 but preferably is accomplished by taking the device in one hand, removing the cap from the tube, and applying thumb pressure (Fig. 5) on lever 24.

Inward pressure on lever 24 moves the parts of mechanism 11 from the positions illustrated in Fig. 4 to the positions shown in Fig. 5. When lever 24 presses platform 33 inwardly the latter pivots on pin 35, pushing on squeeze plate 30 and tending to slide the platform rearwardly through slots 36. Thus the rearward pin 37 of the platform is tilted outwardly, pulling hinge plates 38 outwardly and carrying the forward end of squeeze plate 31 towards the squeeze plate 30. The plate 30 is being simultaneously urged inwardly by the inward tilting of the forward end of platform 33 and thus the convex surfaces of the squeeze plates gradually roll on the rearward portions of the collapsible tube and progressively squeeze the contents from the tube. The curvature of the plates is such that pressure is applied to the tube progressively on a large area to urge the tube contents forward and outward. There is no quick flattening of the tube as for example in roller action which tends to break the walls of the tube at the edges of the flattened portion. It will be noted that the curvature of the plates adjacent hinge pins 28 and 29 will be sufficient to permit passage of the end clip closure of a tube when in the position of Fig. 4. When in the position of Fig. 5 it will be seen that the squeeze plates will press the walls of the tube tightly together, thus preventing any rearward passage of the tube contents.

At the same time the squeezing action takes place, rocker arm 41 pivoted on pin 40 is moved inwardly and forwardly by the hinge plates 38 and the lower engaging end thereof is withdrawn forwardly from engagement with the tooth of rack 20. This end moves into a position over an adjacent saw tooth forward on the rack, engaging the spring member 43 which urges it into engagement with said forward tooth.

When pressure on lever 24 is removed, the compressed spring 43 seats the rocker arm 41 firmly engaging the rack tooth, being rammed into its new saw tooth position. From this wedged position the further pressure of the spring acting through the rocker arm tends to inch the entire mechanism 11 forward as it moves the hinge plates 38 back down into the position of Fig. 4. The tube is then firmly held between the squeeze plates and the opening 15 in the front of the box casing. The engagement of rocker arm 41 in rack 20 prevents any backward movement of the squeeze plates 30 and 31 or of the entire mechanism 11.

The process can be repeated by pressing and releasing lever 21 until the tube has been emptied, at which time the box casing is opened and a new tube inserted.

Having fully described my invention, I claim:

1. Apparatus for dispensing paste or like material from a collapsible tube, comprising a casing, a rack therein, a squeezing device contained in the casing and movable on the rack, said device having a rigid frame with complementary squeezing members, corresponding ends of said members being spaced and pivotally mounted on the frame to receive and pass the flat end of a collapsible tube, hinge means operatively connecting the squeezing members to pivot facing portions thereof towards each other, a rack engaging rocker arm pivoted on said hinge means and movable out of engagement with the rack simultaneously with movement of said squeezing members, hand operable means accessible from the outside of the casing to operate said hinge means to urge the squeezing members together and lift the rocker arm from rack engaging position to a position forward on the rack, and spring means on the frame bearing against said rocker arm to force the same back into engagement with the rack at said new forward rack position and to advance the device along the rack.

2. A device for dispensing the contents of a collapsible tube, comprising a casing with an opening at the forward end thereof for extension of the tube tip, a forwardly pointing saw tooth rack in the casing, a tube squeezing mechanism movable in the casing on the rack, said mechanism having a U-shaped frame with its base rearwardly positioned in the casing and provided with a narrow slot to pass the flat end of said tube, two mating convex curved squeeze plates, each having its rearward end povitally mounted between the side arms of the frame and bordering opposite edges of said slot, hinge plates in parallel relation with said frame arms and pivotally mounting between them the forward end of one squeeze plate, a pivot pin extending between the arms of the frame adjacent the forward end of the other squeeze plate with a manually operable platform member pivotally mounted on said pin, hinge pins on said platform on each side of the pivot pin, the forward pin being hinged to the outer end of said second squeeze plate and the rearward pin being hinged to said hinge plates, a rocker arm mounted on the hinge plates adjacent the connection with said first squeeze plate and having the free end of the rocker adapted to releasably engage the saw tooth rack, and spring means to bias said rocker to rack engaging position, whereby tilting pressure on said platform draws the forward portions of said squeeze plates together and releases said free end of the rocker for movement to a position forward on the rack, said spring means on release of said tilting pressure restoring the rocker to rack engagement at said forward position.

ALEXANDER A. CAMPBELL.

No references cited.